United States Patent
Deters

[11] 3,782,858
[45] Jan. 1, 1974

[54] CONTROL APPARATUS FOR A WATER SUPPLY SYSTEM

[75] Inventor: Elmer M. Deters, Muscatine, Iowa

[73] Assignee: Red Jacket Manufacturing Company, Davenport, Iowa

[22] Filed: Oct. 24, 1972

[21] Appl. No.: 300,211

[52] U.S. Cl................ 417/26, 137/505.41, 417/38, 417/44
[51] Int. Cl....................... F04b 49/02, F04b 49/08
[58] Field of Search.......................... 417/38, 44, 26; 137/505.41

[56] References Cited
UNITED STATES PATENTS
3,100,505  8/1963  Johnsen........................... 417/44 X
3,106,894  10/1963  Johnsen........................... 417/44 X

*Primary Examiner*—Carlton R. Croyle
*Assistant Examiner*—Richard Sher
*Attorney*—Vernon J. Pillote

[57] ABSTRACT

A control apparatus for a water supply system having a motor operated pump for pumping water through a delivery line to one or more valved outlets. The control apparatus includes a pressure switch responsive to the pressure in the delivery line and operable at preselected upper and lower pressure limits to respectively stop and start the pump motor, and a valve which regulates flow from the pump to the delivery line and is operated by a pneumatically loaded diaphragm responsive to the pressure in the delivery line to maintain the pressure in the line substantially constant at a value intermediate the upper and lower pressure limits during normal flow from the delivery line, with a bypass for passing a restricted flow of fluid into the delivery line, when the flow from the delivery line is shut off and the valve is closed, to increase the pressure in the delivery line and operate the switch to shut off the pump motor. The diaphragm also functions as a small expansion chamber to limit the frequency at which the control apparatus will cycle the pump motor, when water is drawn from the delivery line at a rate below the bypass rate, and provision is made for controlling the expansion and contraction of the diaphragm in a manner to effect a rapid increase in pressure into the delivery line to shut off the pump motor, when flow from the delivery line is terminated.

6 Claims, 6 Drawing Figures

PATENTED JAN 1 1974
3,782,858
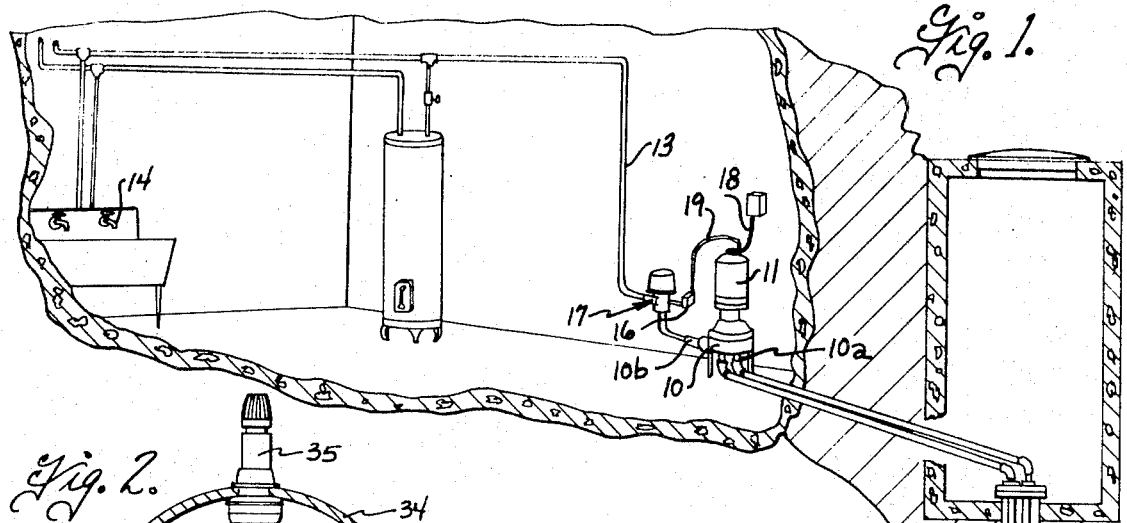
Fig. 1.
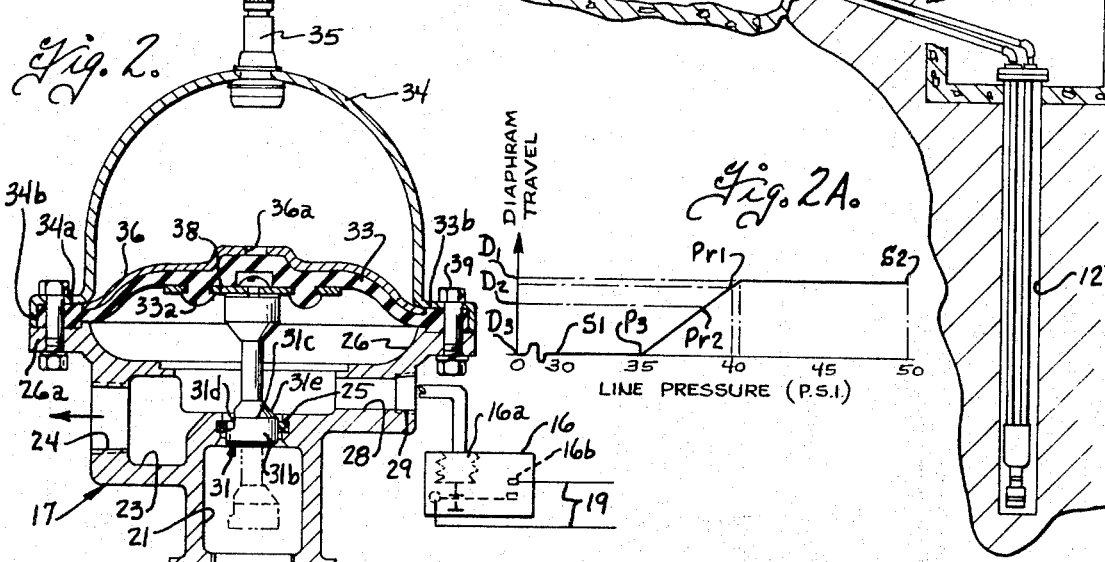
Fig. 2.
Fig. 2A.
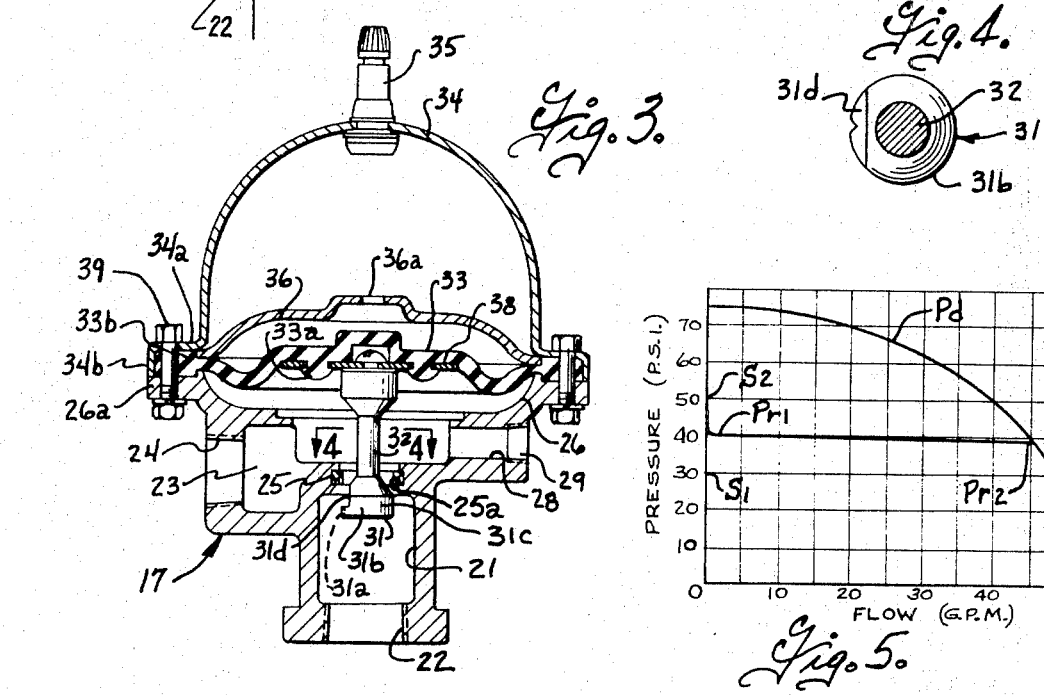
Fig. 3.
Fig. 4.
Fig. 5.

CONTROL APPARATUS FOR A WATER SUPPLY SYSTEM

BACKGROUND OF THE INVENTION

The present invention relates to water system control apparatus of the type having a pressure switch responsive to the pressure in the delivery line for starting and stopping the pump; a valve for controlling flow into the delivery line; a pressure loaded diaphragm responsive to the pressure in the delivery line for controlling operation of the valve to regulate the pressure in the line at a value below the upper switch operating pressure during normal flow from the line; and a bypass to pass a restricted flow into the delivery line when flow from the line is terminated to cause the pressure in the line to build up above the regulated pressure and operate the pressure switch to shut off the pump. In such control apparatus, the pump will cycle on and off if the flow from the delivery line is less than the bypass rate. It is accordingly desirable to make the bypass very small to minimize the flow rate below which cycling can occur. However, under some conditions, such as due to an improperly closed outlet valve or other leakage from the delivery line, very low flows can occur from the line and, in order to prevent rapid cycling of the pump motor with the consequent danger of motor failure at such low flow rates, it is also desirable to provide an expansion chamber to maintain the pressure in the delivery line above the lower switch operating pressure for a time interval after stopping the pump.

One such water system control apparatus is disclosed in the U. S. Pat. to O. F. Johnsen, No. 3,100,505. In the control apparatus disclosed in that patent, the diaphragm is arranged to move away from the valve member when the valve member closes and the pressure in the line increases above the regulated pressure to provide a small expansion chamber. An objection to that system was that the restricted flow of fluid through the bypass caused a slow buildup in pressure in the delivery line so that there was a substantial time lapse between stopping of discharge from the delivery line and stopping of the pump. This is particularly serious at the very low flow rates from the delivery line at which the control apparatus causes the motor pump to cycle on and off. This objection was recognized by the patentee and in the subsequent U. S. Pat. to O. F. Johnsen, No. 3,106,894 there is disclosed a modified control apparatus utilizing a primary valve with a restricted bypass as well as a secondary valve arranged to open after the primary valve is closed, to effect rapid filling of the expansion chamber. While the construction shown in this last-mentioned patent decreases the time lapse between termination of flow and stopping of the pump, it does increase the complexity of the valve apparatus and the cost of making the same.

The present invention relates to improvements in water system control apparatus of the type described. Various important objects of the present invention are to provide an improved water system control apparatus which is operative to maintain a substantially constant pressure in the delivery line during normal flow from the line; which avoids repeated cycling of the pump motor on and off during draw of water from the line, except at very low draw rates; which cyclically operates the pump motor on and off at the very low draw rates in a manner to maintain the pump on-time short as compared to the pump off-time; and which minimizes the delay between termination of draw and shut-off of the motor pump; which is simple and economical in construction and reliable in operation.

These, together with other objects and advantages of this invention will be apparent from the following detailed description and the accompanying drawings wherein:

FIG. 1 is a fragmentary sectional view of a water system installation embodying the control apparatus of the present invention;

FIG. 2 is a sectional view through the valve apparatus illustrating the same in a closed position;

FIG. 2A is a graph illustrating the relationship between the delivery time pressure and the diaphragm travel;

FIG. 3 is a sectional view through the valve apparatus illustrating the same in a moved position;

FIG. 4 is a fragmentary sectional view taken on the plane 4—4 of FIG. 3; and

FIG. 5 is a graph illustrating the change of pump pressure and delivery line pressure with flow from the delivery line.

The control apparatus of the present invention is arranged for use in a water supply system having a pump 10, such as a centrifugal pump or jet pump, driven by an electric motor 11. As shown in FIG. 1, the pump has its inlet 10a connected to a water supply source such as a well 12 and its outlet 10b connected to a fluid delivery line 13 having one or more valved outlets 14. The control apparatus in general includes a pressure switch 16 which is operated in response to the pressure in the delivery line to start and stop the pump motor, and a valve apparatus 17 connected to control of flow from the pump to the delivery line. As diagrammatically shown in FIG. 1, the pump motor 11 is connected through lines 18 to a source of electrical power and is connected through lines 19 to the pressure switch 16 to be energized under the control of the pressure switch. The pressure switch 16 is of the type commonly used in pressure tank type water systems and which includes a pressure responsive actuator 16a that is operative at a preselected lower delivery line pressure, for example 30 p.s.i., to close motor control contacts 16b and start the pump motor 11 and which maintains the pump motor 11 energized until the delivery line pressure rises to a preselected upper pressure limit, for example 50 p.s.i., at which time the pressure switch opens the motor control contacts and stops the pump motor. Such pressure switches which operate to start and stop the pump at preselected upper and lower pressure limits are well known and further detailed illustration or description is deemed unnecessary.

The valve apparatus 17 is best shown in FIGS. 2 and 3 and includes a valve body having an inlet chamber 21 adapted for connection as by a threaded inlet passage 22 to the pump discharge, an outlet chamber 23 adapted for connection as by a threaded outlet passage 24 to the delivery line 13, and a valve seat 25 intermediate the inlet and outlet chambers. The valve body also has a diaphragm bowl 26 coaxial with the valve seat and communicating with the outlet chamber 23. The pressure switch 16 is connected for operation in response to the pressure in the delivery line 13 and, conveniently, the valve body is provided with a passage 28 that communicates with the outlet chamber 23 and hence with the delivery line, and which is adapted for connection as by a threaded fitting 29 to the pressure switch 16 to enable mounting the pressure switch on the valve body as shown in FIG. 1.

A valve member 31 is provided to control flow through the orifice 25 and is connected through a stem 32 to the central portion of a diaphragm 33 that is peripherally attached to the diaphragm bowl and which has one side exposed to the fluid pressure in the outlet chamber and hence to the pressure in the delivery line. A pressure bell 34 is attached to the valve body at the other side of the diaphragm and is pneumatically charged to apply pressure to the diaphragm in opposition to the water pressure in the outlet chamber. The diaphragm is arranged to control movement of the valve member relative to the valve seat to maintain the pressure in the delivery line at a relatively constant value below the upper switch operating pressure during normal draw of water from the system, and a bypass 31a is provided to pass a restricted flow of water into the delivery line when flow from the line is terminated to cause the pressure in the line to build up above the regulated pressure and operate the pressure switch to shut off the pump. If water leaks or is withdrawn from the delivery line at flow rates below the bypass rate, the pressure switch will cycle the pump motor on and off and the diaphragm is accordingly arranged to also function as a small expansion chamber to control the rate at which the system will cycle at very low draw rates. As shown, a charging valve 35, conveniently of the type used on rims of tubeless tires, is provided in the bell 34 for charging the bell to a preselected pressure. For example, the pressure bell 34 is charged to a pressure such that the valve member will seat when the pressure in the outlet chamber reaches a preselected pressure such as 40 p.s.i. which is intermediate the upper and lower switch operating limits which may, for example, be 50 and 30 p.s.i. respectively. When the pump is operating and water is being withdrawn from the system at rates above the bypass rate, the diaphragm will move the valve member relative to its seat to variably throttle the flow through the seat and regulate the pressure in the delivery line at a pressure of about 40 p.s.i., and substantially below the upper switch operating pressure so as to prevent shutoff of the pump motor during normal draw of water from the line. However, when the flow from the delivery line is terminated or throttled below the bypass rate, the diaphragm will move the valve member to its seated position at about 40 p.s.i. and the bypass 31a then operates to pass a restricted flow of water from the inlet chamber into the outlet chamber to raise the pressure in the outlet chamber above the 40 p.s.i. valve seating pressure and up to the upper switch operating pressure.

It is desirable to maintain the delivery line pressure during normal draw from the delivery line sufficiently below the upper switch operating pressure to prevent spurious operation of the pressure switch due to pressure surges in the delivery line. However, it is also desirable to minimize the time lapse between termination of flow from the delivery line and stopping of the pump motor. In accordance with the present invention, a diaphragm stop plate 36 is fixed to the pneumatic bell 34 and positioned to extend closely adjacent the diaphragm 33 when the valve member 31 reaches its seated position, so as to limit further expansion movement of the diaphragm after the valve member has reached a seated position whereby the restricted flow of fluid through the bypass 31a produces a relatively rapid change in pressure from the regulated pressure of 40 p.s.i. to the upper switch operating pressure of 50 p.s.i. It is necessary to assure that the valve member is seated before expansion movement of the diaphragm is stopped, and the stop plate is accordingly positioned so as to have only a slight clearance above the diaphragm when the valve member initially reaches a seated position.

The valve member 31 operates to regulate flow through the orifice in a relatively small portion of its overall stroke as it moves from the seated position shown in FIG. 2 to a fully opened position as shown in FIG. 3 and in response to a relatively small change in pressure in the outlet chamber at the underside of the diaphragm. For example, as graphically illustrated in FIG. 2A, the diaphragm will move from the position $D_1$ at which the valve member 31 is seated when the pressure in the outlet chamber is at a pressure $Pr_1$ such as 40 p.s.i. and, as the pressure in the outlet chamber decreases, the diaphragm will move downwardly and fully open the valve member when the diaphragm reaches a second position designated $D_2$ at a pressure $Pr_2$ such as 37 or 38 p.s.i. Thus, when the pump is operating, the pump discharge pressure will vary as indicated by the pressure-flow curve Pd in FIG. 5. However, when the flow from the delivery line is above the bypass rate, the diaphragm 33 will operate the valve member to throttle flow to the delivery line and maintain the delivery line pressure substantially constant in a range between $Pr_1$, when delivery line flow is just above the bypass rate and pressure $Pr_2$ when the flow from the delivery line equals full pump flow at that pressure and valve member 31 is in its fully open position as shown in FIG. 3.

When the flow from the line is shut off, the bypass passes a restricted flow of water, for example at a rate of about one-tenth gallon per minute or less, into the outlet chamber. The diaphragm stop plate is positioned closely adjacent the diaphragm when it is in position $D_1$ so as to limit further expansion movement of the diaphragm. Accordingly, the bypass flow, even though at a very low flow rate, causes the pressure in the outlet chamber to rapidly build up, for example in about 3 to 5 seconds after draw is terminated, from the pressure $Pr_1$ to the upper switch operating pressure $S_2$ to stop the pump motor.

As noted above, the control apparatus will cause the pump motor to cycle on and off if water leaks or is drawn from the delivery line at a rate below the bypass rate. Rapid cycling of the pump motor on and off is objectionable and can result in overheating and failure of the motor. The control apparatus is arranged to delay restarting of the pump after shutoff for a minimum time interval which is large as compared to the time interval required to buildup the pressure in the line when the motor is restarted, so that even under the most adverse conditions in which the pump motor is cycled on and off, the motor on-time is short as compared to the motor off-time. For this purpose, the diaphragm 33 is arranged to also function as a small expansion chamber which operates to maintain the pressure in the delivery line above the lower switch operating pressure $S_2$ for at least a minimum time interval after stopping the pump, in the event there is leakage or drawing of fluid from the delivery line at a very low rate below the rate of flow through the restricted bypass 31a. The diaphragm bowl 26 is spaced below the diaphragm stop plate 36 a distance substantially greater than the stroke of the valve member necessary to move it between its seated and its fully opened positions, and such that the diaphragm displaces a quantity of water which is sufficiently large as compared to the bypass rate to delay any decrease in pressure in the delivery line after stopping of the pump, which may be caused by leakage or drawing of water from the line at a rate below the bypass rate for a minimum time interval which is long as compared to the time required for the pump to build the pressure back up to stop the motor. In the embodiment illustrated, the diaphragm bowl 26 is spaced from the stop plate a distance such that the diaphragm displaces about one-twentieth of a gallon of water as it moves from position $D_1$ to position $D_3$ against the bowl, and the bypass 31a is arranged to restrict the flow to about one-tenth gallons per minute or less. Under leakage conditions of one-tenth gallons per minute from the delivery line, the diaphragm would maintain the delivery line pressure above the lower switch operating pressure $S_1$ (30 p.s.i.) for at least 30 seconds and longer at lower leakage rates. However, when the pump is restarted, it rapidly refills the expansion chamber before the valve seats at pressure $Pr_1$ and the pressure in the outlet chamber thereafter rapidly builds up to the upper switch operating pressure $S_2$ in a relatively shorter time interval, of about 3 to 5 seconds.

The volume of the pressure bell above the stop plate is made substantially larger than the volume displaced by the diaphragm as it moves from the stop plate to the diaphragm bowl so that the change in pressure in the outlet chamber from $Pr_1$ to $P_3$ as the diaphragm moves from position $D_1$ adjacent the stop plate to position $D_3$ at the diaphragm bowl, is a small percentage of the regulated pressure $Pr_1$. For example, in the disclosed valve apparatus, the volume of the pressure bell above the stop plate 36 is about five times the volume of the displacement of the diaphragm 33 as it moves between the stop plate and the diaphragm bowl. Thus only a relatively small decrease in pressure, of the order of 5 to 7 p.s.i. from the normal regulated pressure of about 40 p.s.i. will cause the diaphragm to move through its full stroke. Moreover, this change in pressure is small as compared to the differential between the upper and lower switch operating pressures $S_2$ and $S_1$.

The valve seat 25 and valve member 31 are preferably of the type illustrated in the drawings and in which the valve seal comprises a resilient inwardly facing seat and the valve member is formed with a peripheral valve face seat and the valve dimensioned to be slidably received in the seat. In the embodiment shown, the seat comprises an annular body of resilient material such as plastic or rubber positioned in an annular recess in the valve body and preferably having a downwardly opening groove to provide an inner resilient lip portion which forms the inwardly facing valve seat. The valve member 31 has its lower end portion formed with a cylindrical outer periphery 31b dimensioned to be slidably received in the inwardly facing seat and the bypass comprises a small notch or a groove 31a in the cylindrical portion dimensioned to pass the restricted flow of fluid from the inlet chamber to the outlet chamber, when the valve member is seated. In order to reduce chattering of the valve member as it approaches its seated position, particularly at high pressures, the valve member is preferably formed with a second valve portion 31c having a cross-section slightly smaller than the cylindrical valve portion 31b so as to throttle flow through the orifice before the cylindrical valve portion reaches its seated position. The second valve portion can conveniently comprise a continuation of the cylindrical lower portion with a flattened area 31d at one side providing a reduced flow passage when the second valve portion extends into the orifice. The valve member is arranged to be self-centering in the valve seat and has an outwardly flaring upper face 31e.

The valve member is formed rigidly with the stem 32 and the stem is attached to the diaphragm 33 for movement as a unit with the diaphragm. In order to minimize possible leakage, the diaphragm is made imperforate and attached to the stem by integral plugs 33a that extend through openings in a diaphragm mounting plate 38. The diaphragm mounting plate is attached to the upper end of the stem as by a fastener and additionally functions to reinforce the central portion of the diaphragm.

The diaphragm is formed with an integral thickened rim 33b around it outer periphery which is interposed between a flange 26a on the diaphragm bowl and an outwardly extending flange 34a on the lower end of the bell, to seal the interface between the diaphragm, the valve body and the bell. The bell is preferably formed with a depending lip 34b which is arranged to engage the flange on the diaphragm bowl to control compression of the thickened rim on the diaphragm when the pressure bell is fastened to the diaphragm bowl by clamp bolts 39. The periphery of the stop plate 36 is interposed between the flange 34a on the pressure bell and the upper side of the diaphragm, inwardly of the raised rim 33b on the diaphragm.

From the foregoing it is thought that the construction and operation of the control apparatus will be readily understood. For the purpose of describing the operation, it will be assumed that the control apparatus is initially in the position shown in FIG. 2 and that the pressure in the delivery line has built up to the upper switch operating pressure $S_2$ of 50 p.s.i. and that the pump is stopped. If one of the outlet valves 14 is opened to draw water from the delivery line, the pressure in the delivery line and outlet chamber will rapidly decrease to the lower switch operating pressure $S_2$ (30 p.s.i.) and start the pump. The pressure in the delivery line will then build up to the operating pressure range of about 37 to 40 p.s.i. and the diaphragm 33 will move the valve member 31 upwardly toward the valve seat 25 to variably throttle the flow through the seat and maintain the delivery line pressure substantially constant independent of the pump discharge pressure. As the flow from the delivery line is decreased, the valve member moves upwardly and reaches its seated position at about 40 p.s.i. At that time, flow through the seat is shut off except for the restricted bypass flow through bypass passage 31a. Since the diaphragm stop plate 36 is positioned closely adjacent the diaphragm when the valve member is seated, only a relatively small quantity of fluid needs to flow into the outlet chamber to cause the diaphragm to expand slightly into firm engagement with the stop plate. At that time, further expansion of the diaphragm chamber is stopped and the pressure in the diaphragm chamber and delivery line builds up rapidly as shown in FIG. 2A from $Pr_1$ to the upper switch operating pressure $S_2$ of about 50 p.s.i., to thereby stop the pump motor. Thus, during normal draw of water from the delivery line, the diaphragm operates the valve member to prevent the pressure in the delivery line from building up to the upper switch operating pressure so that the pump operates continuously during normal draw, and the pump operation is terminated shortly after termination of flow from the delivery line. If fluid leaks or is withdrawn from the delivery line at a very low rate below the bypass rate, the control apparatus will cycle on and off. However, the diaphragm 33 also functions as a small expansion chamber which is operative to maintain the pressure in the delivery line above the lower switch operating pressure under leakage conditions, for a time interval to prevent excessively rapid cycling of the motor.

The embodiments of the invention in which an exclusive property or privilege is claimed are defined as follows:

1. A control apparatus for a water system having a motor operated pump for pumping water through a delivery line to one or more valved outlets, the control apparatus including a valve body having an inlet chamber adapted for connection to a pump and an outlet chamber adapted for connection to a delivery line of a water system and a valve seat intermediate the inlet and outlet chambers, pressure operated motor control switch means responsive to the pressure in said outlet chamber for energizing the pump motor when the pressure in the outlet chamber reaches a selected lower switch operating pressure and for de-energizing the pump motor when the pressure in the outlet chamber reaches a selected upper switch operating pressure, said valve body having a diaphragm bowl in open communication with said outlet chamber and coaxial with said valve seat and a diaphragm peripherally attached to said diaphragm bowl and extending across the bowl to define an expansion chamber therewith, a valve member in said inlet chamber cooperable with said seat for controlling flow therethrough, the valve member having a stem extending through the seat and engageable with the diaphragm for movement into and out of a seated position under the control of said diaphragm, a pneumatic pressure bell attached to said diaphragm bowl at the side opposite said expansion chamber and pneumatically charged to apply pressure to the diaphragm in opposition to the fluid pressure in the expansion chamber and such as to allow seating of the valve member when the pressure in the outlet chamber rises to a preselected value intermediate said upper and lower switch operating pressures, and bypass means for passing a restricted flow of water from the inlet chamber into the outlet chamber when the valve member is seated, the improvement comprising: a diaphragm stop plate fixed to said bell and shaped to extend closely adjacent the diaphragm when the pressure in the outlet chamber rises to said preselected value at which the valve member is seated for limiting expansive movement of the diaphragm whereby the restricted flow of water from the inlet chamber through the bypass causes the pressure in the outlet chamber to rapidly build up to said upper switch operating pressure, said valve member being movable by said diaphragm from a seated position when the diaphragm engages said diaphragm stop plate to a fully open position when the diaphragm has moved a preselected distance away from the stop plate, said diaphragm bowl being spaced from said stop plate a distance substantially greater than said preselected distance to allow continued contraction of said diaphragm chamber after the valve member has moved to its fully open position, whereby said bowl engages the diaphragm to limit contraction of the expansible chamber only after the diaphragm has displaced a selected volume of water, the volume of said pressure bell above the diaphragm stop plate being substantially larger than said volume of water displaced by said diaphragm as it moves between said stop plate and said diaphragm bowl and such that the pressure change in the outlet chamber necessary to move the diaphragm between the stop plate and diaphragm bowl is small as compared to the differential between said upper and lower switch operating pressures.

2. A control apparatus according to claim 1 wherein said valve member, valve stem and diaphragm are fixedly interconnected for movement as a unit.

3. A control apparatus according to claim 2 wherein said stem has a rigid diaphragm mounting plate attached thereto and having openings therein, said diaphragm being imperforate and having integral headed protuberances extending through said openings in the mounting plate to attach the diaphragm to the mounting plate and valve stem.

4. A control apparatus according to claim 2 wherein said valve seat comprises an annular inwardly facing seat of resilient material, said valve member having a substantially cylindrical valve portion dimensioned to be slidably received in said inwardly facing seat, said bypass means comprising a notch in said cylindrical valve portion arranged to pass water from the inlet chamber to the outlet chamber when the valve member is seated.

5. A control apparatus according to claim 2 wherein said valve seat comprises an annular inwardly facing seat of resilient material, said valve member having a substantially cylindrical valve portion dimensioned to be slidably received in said inwardly facing seat, said bypass means comprising a notch in said cylindrical valve portion arranged to pass water from the inlet chamber to the outlet chamber when the valve member is seated, said valve member having a second semicylindrical valve portion on the side of said cylindrical valve portion adjacent said seat to throttle flow through said inwardly facing seat when said second valve portion extends into said seat to a value intermediate said restricted flow and full flow through the valve.

6. A control apparatus according to claim 1 wherein said diaphragm has an integral raised rim extending around the outer periphery thereof, said pressure bell having a peripheral mounting flange overlying said raised rim on the diaphragm and fastened to the diaphragm bowl to seal the periphery of the diaphragm to the bowl and pressure bell, said diaphragm stop plate having the periphery thereof interposed between the diaphragm and the mounting flange on the pressure bell inwardly of said raised rim on the diaphragm.

* * * * *